W. R. HULL.
MACHINE FOR ASSEMBLING BOLTS AND NUTS.
APPLICATION FILED AUG. 2, 1917.
1,274,562.
Patented Aug. 6, 1918.
5 SHEETS—SHEET 1.
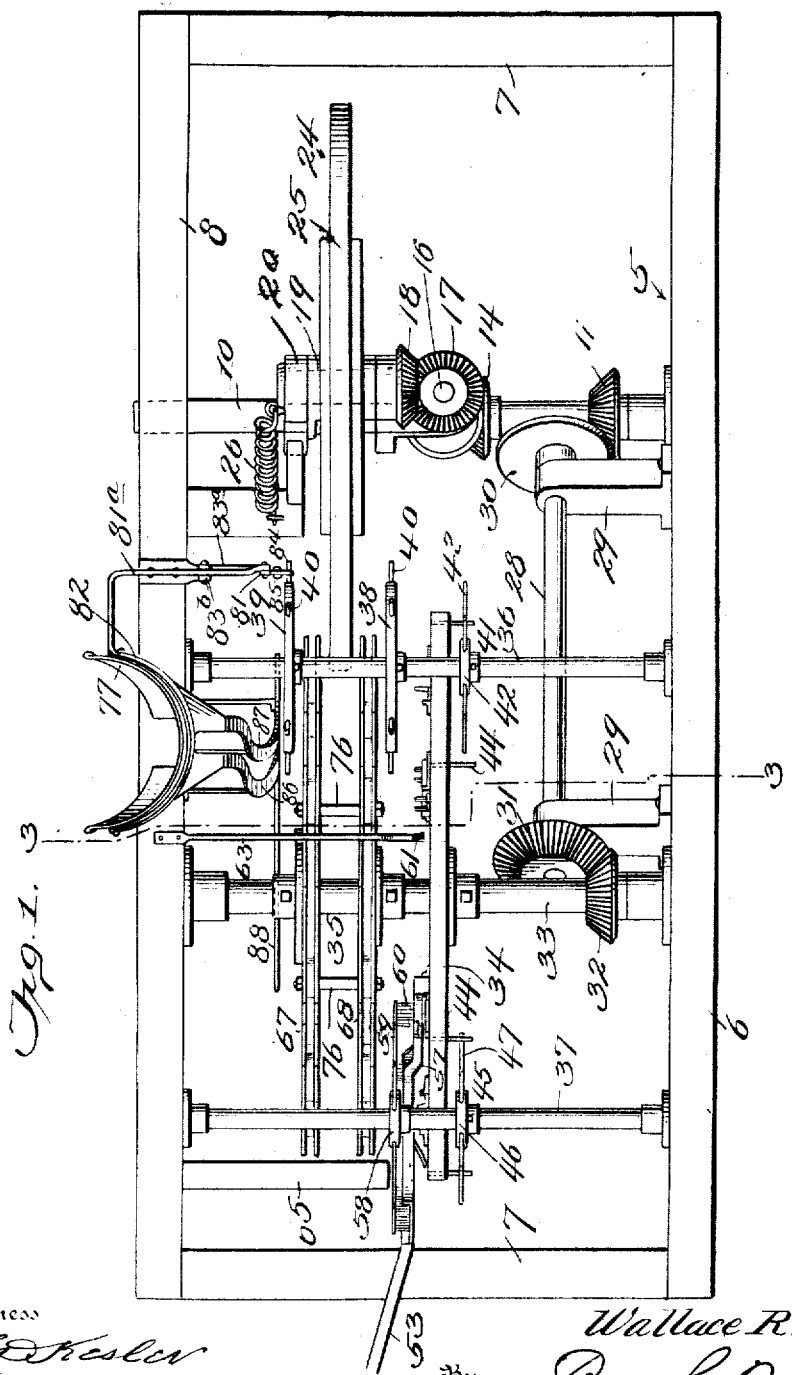
Witness
E. D. Kesler
Chas. E. Heger.
Inventor
Wallace R. Hull
By James L. Norris
Attorney

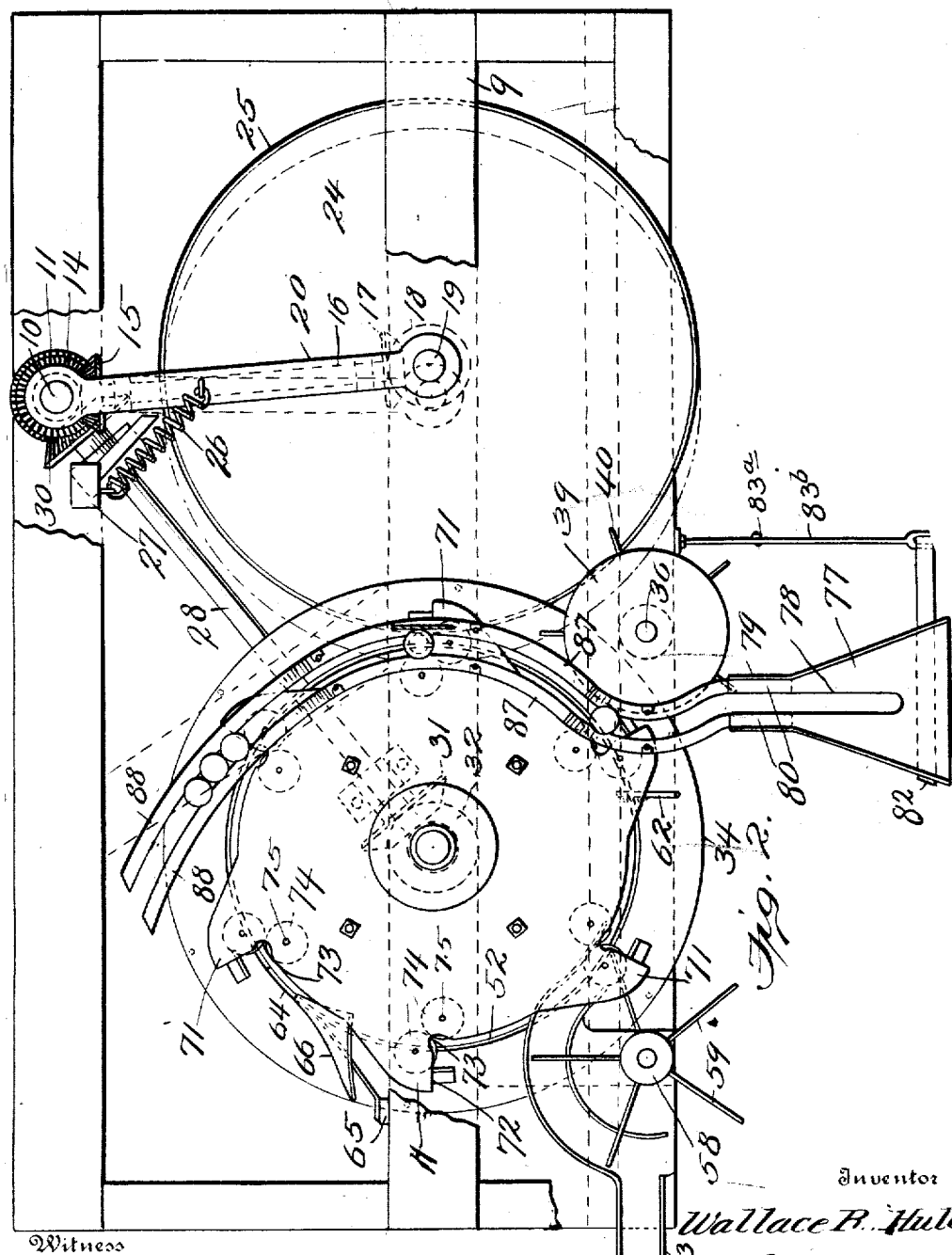

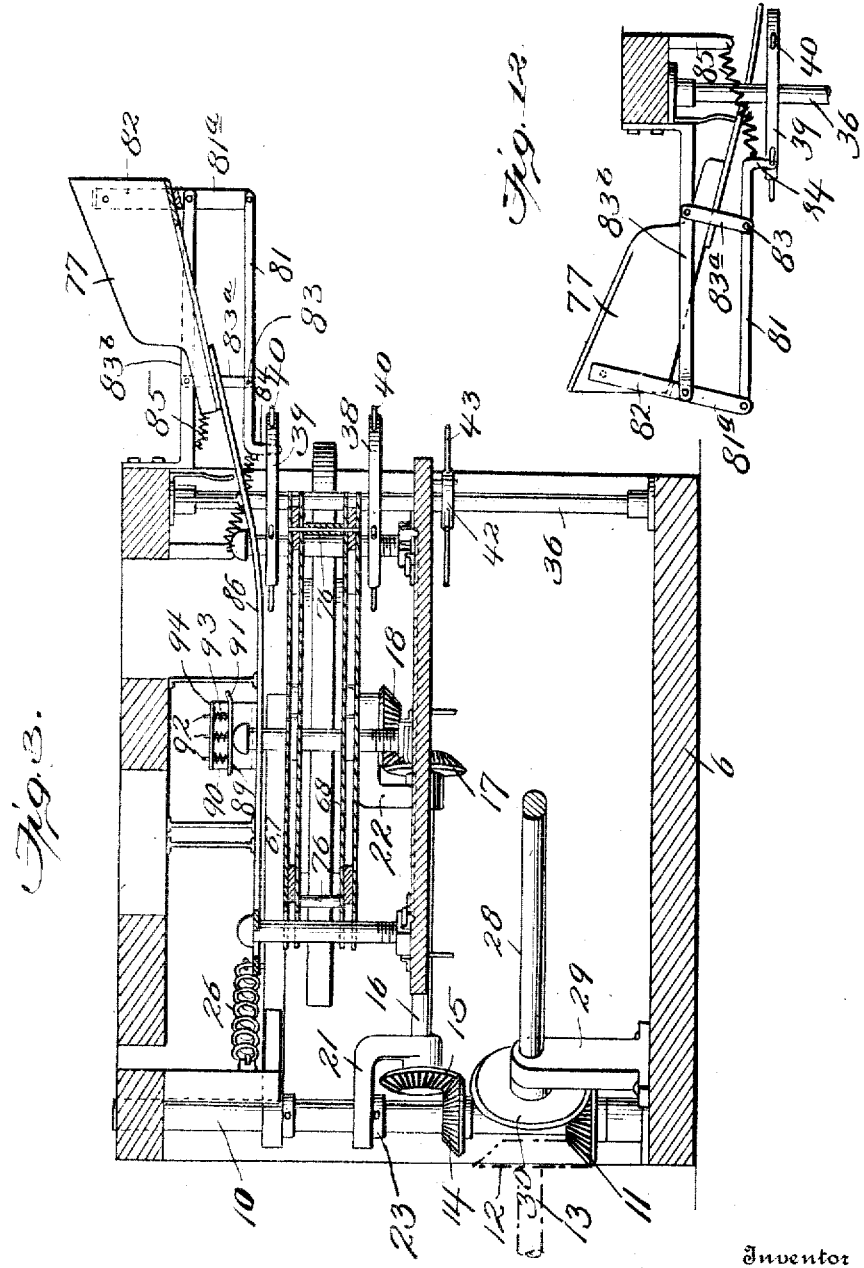

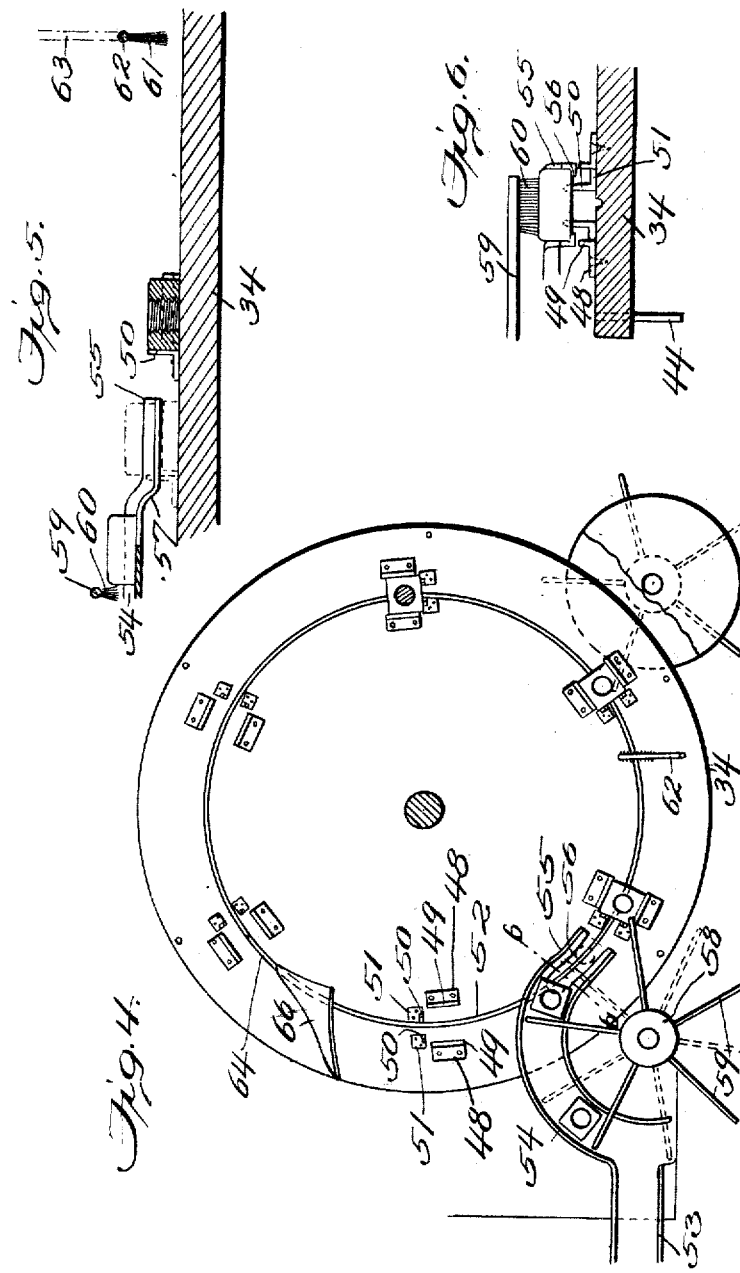

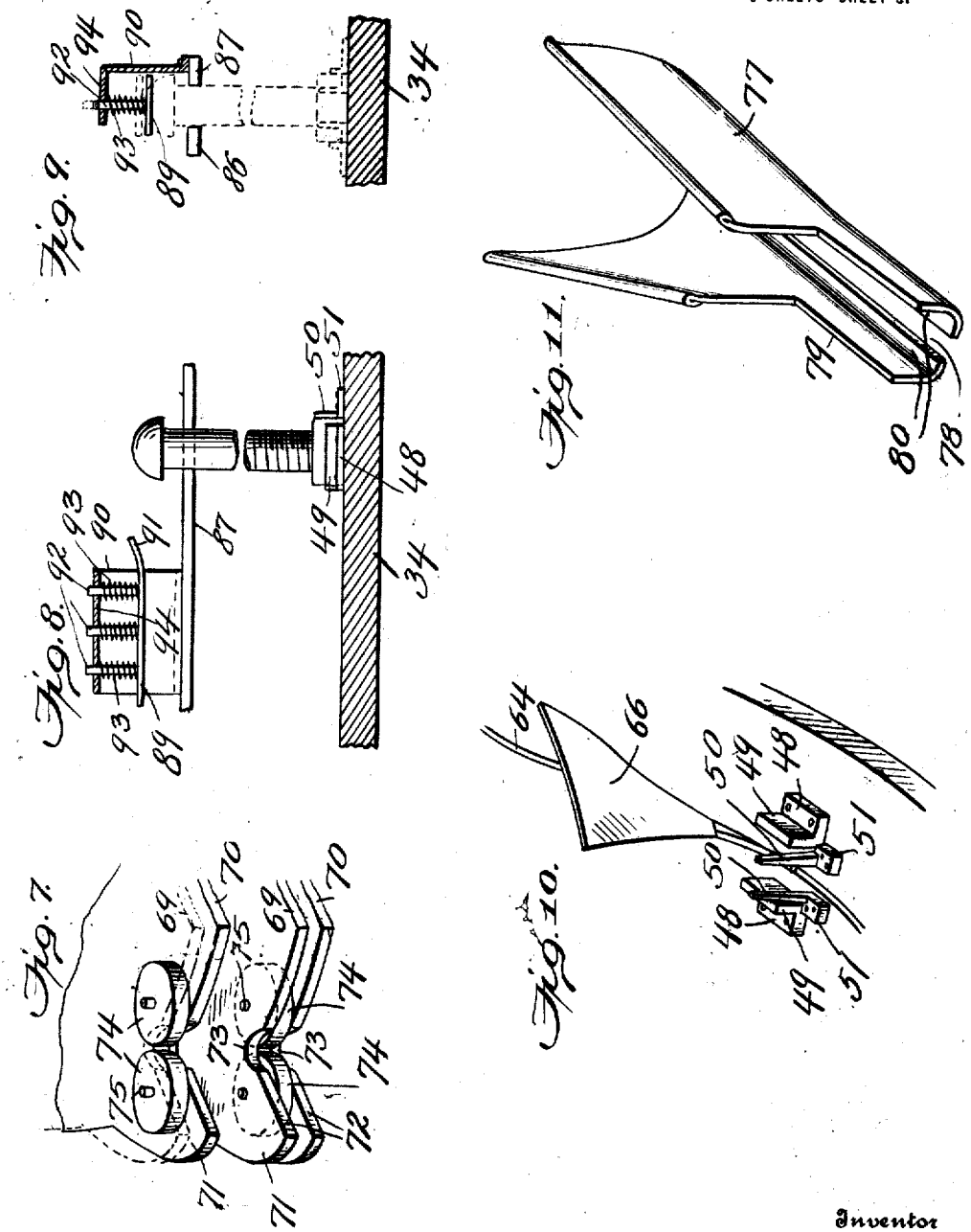

UNITED STATES PATENT OFFICE.

WALLACE R. HULL, OF PITTSBURGH, PENNSYLVANIA.

MACHINE FOR ASSEMBLING BOLTS AND NUTS.

1,274,562.   Specification of Letters Patent.   Patented Aug. 6, 1918.

Application filed August 2, 1917.   Serial No. 184,115.

*To all whom it may concern:*

Be it known that I, WALLACE R. HULL, a citizen of the United States, residing at Pittsburgh, in the county of Allegheny and State of Pennsylvania, have invented new and useful Improvements in Machines for Assembling Bolts and Nuts, of which the following is a specification.

This invention relates to a nutting machine or to an apparatus or a mechanism for applying nuts to bolts to prepare the latter for commercial vendition.

One object of the invention is to provide mechanism for expeditiously and effectively feeding bolts and nuts into relatively engaging positions for positive assemblage, and to ultimately discharge the nutted bolts ready for packing for the trade. A still further object of the invention is to generally improve and simplify the operation of this class of machines by providing them with novel means for causing a feeding action of the nuts and gravitating feeding action and accurate placement of the bolts over and in engagement with the nuts and a retention of the nuts against rotating while the bolts are individually rotated and uniformly screwed into the nuts. A still further object of the invention is to entirely dispense with hand labor in the assemblage of bolts and nuts by means of automatic mechanism controlling the feed of the bolts and nuts in regular sequence and in timed relation, and also to remove unused nuts or those which are not assembled with the bolts to avoid checking the operation of the machine and interference with the regular feed of the nuts from a source of supply.

With these and other objects and advantages in view, the invention consists in the construction and arrangement of the several parts which will be more fully hereinafter described and claimed.

In the drawings:

Figure 1 is a side elevation of a machine embodying the features of the invention.

Fig. 2 is a top plan view of the improved machine partially broken away.

Fig. 3 is a transverse vertical section taken in the plane of the line 3—3, Fig. 1.

Fig. 4 is a top plan view of the nut carrier and means for supplying the same and a part of the means for intermittently moving said carrier.

Fig. 5 is a transverse vertical section of a part of the intermittently operating nut carrier, the nut remover and part of the means for operating the carrier.

Fig. 6 is a transverse vertical section taken in the plane of the line 6—6, Fig. 4.

Fig. 7 is a detail perspective view of a portion of the bolt feeder.

Fig. 8 is a detail vertical sectional view showing a part of the nut carrier, bolt rail and bolt holder, a bolt and nut being shown in engagement in position for united movement toward the holder and prior to movement of the bolt into the nut.

Fig. 9 is a detail sectional view showing a part of the nut carrier, bolt holder, bolt rails and the bolt and nut in dotted lines, the bolt being shown as engaged by the holder and ready for movement into the nut.

Fig. 10 is a detail perspective view of a part of the nut carrier showing one of the nut seats and the operation of the nut remover.

Fig. 11 is a detail perspective view of the bolt receiving and feeding hopper.

Fig. 12 is a detail sectional elevation showing the bolt receiving and feeding hopper and oscillating means therefor.

The numeral 5 designates a suitable base consisting of a frame structure, that may be of any form for the purpose of supporting the various parts, and embodying components in practical position for engagement by the various mechanical devices and coöperating elements comprised in the improved machine. As shown, this base consists of a lower frame 6 of metal or other material having end uprights 7 connected to a top frame 8 provided with a longitudinal member 9. The base, including the parts just explained, will be braced and supplied with any other structural features that may be found necessary for conveniently assembling the several mechanical parts or elements. In a suitable position in the base and between the upper and lower frames 6 and 8, a vertically disposed drive shaft 10 is mounted and actuated from a suitable source of power in a manner which will be presently set forth. On this shaft 10 is a lower bevel gear 11 with which a corresponding gear 12 on a power transmitting shaft 13 has engagement, said power shaft 13 running from a suitable source of power and may be equipped with the usual form of clutches for throwing the same into and out of operative connection with relation to the source of power. On the shaft 10 is a bevel gear 14 at a suitable distance above the gear 11, and meshing with the said gear 14 is a bevel gear 15 on the one end of a shaft 16 serving as a power transmitting shaft and having a similar bevel gear 17 on the opposite end similar to the gear 15 and meshing with a bevel gear 18 on the lower end of a stub shaft 19 held by a swinging arm 20, mounted on the shaft 10 at its opposite end. The shaft 16 has bearing in angular bearing brackets 21 and 22, as clearly shown by Fig. 3, the bracket 21 being held on the shaft 10 by a collar 23 and the bracket 22 engaging the shaft 19 upon the gear 18. On the shaft 19 and keyed to the latter is a bolt rotating disk 24 having a peripheral binding or rim 25 of any suitable material, such as emery, wood, copper, or any other substance that will set up a rotative frictional adhesion relatively to the several bolts engaged thereby in a manner which will hereinafter be more fully explained. The bolt rotating disk 24 is movable with the arm 20, shaft 19 and gear 18, or the said latter parts swing in an arc relatively to the shaft 10 as the center, and the said gear 18, shaft 19 and disk 24 rotate as a unit in a proper direction to give to the several bolts engaged by the periphery of the disk a rotation which will result in a screwing of the bolts relatively to the nuts in engagement therewith. The arm 20 which serves as an arcuate swinging support for the shaft 19, the disk 24 and the gear 18, has one end of a spring 26 secured thereto, the opposite end of this spring being attached to a depending arm or hanger 27 connected to the top frame 8. This spring 26 serves to cause the periphery of the disk 24 to positively engage the several bolts as the latter are fed into position for contact by the said disk periphery.

A counter-shaft 28 is mounted in suitable upright bearings 29 rising from a portion of the base frame 6, and one end of the said shaft 28 has bevel gearing 30 meshing with the gear 11, and on the opposite end of the said shaft is a similar gear 31 meshing with a bevel gear 32 on the lower portion of a vertical transmitting shaft 33 mounted in suitable bearings between the upper and lower frames 6 and 8. Adjustably mounted on the shaft 33 is a nut-carrier or disk 34 and a rotatable bolt-feeder or placer 35. The shafts 10 and 33 are continuously rotated when the machine is in operation, and in addition to these shafts are vertically disposed intermittently operating shafts 36 and 37 also mounted in suitable bearings between the upper and lower frames 6 and 8. The shafts 36 and 37 are preferably spaced at equal distances from the shaft 33 and on one side of the latter or at one side of the machine, as shown by Fig. 2, the shafts 36 and 37 being vertically disposed and in alinement. On the shaft 36 two bolt movers 38 and 39 are adjustably mounted and are in the form of disks having teeth or rods 40 radially extending outwardly therefrom at regular intervals, the bolt movers or the disks 38 and 39 being spaced apart a sufficient distance to engage each bolt coming into the region of operation therewith at points adjacent to the heads of the bolts and near the lower ends of the bolts, so as to regularly move the said bolts and maintain them in vertically straight positions. On the shaft 36, an actuator 41 is also keyed and adjustably mounted and consists of a small disk 42 having outwardly projecting radially arranged arms or rods 43, which are adapted to be struck by depending pins 44 disposed at regular intervals on the nut-carrier 34 and whereby the said actuator 42 will effect a rotation of the shaft 36 at intervals in timed relation to the rotation of the nut-carrier 34 and the bolt feeder and placer 35. Simultaneously the bolt movers 38 and 39 shift the bolts into position for engagement by the bolt feeder and placer 35 and, as shown in Fig. 1, the said bolt movers 38 and 39 are positioned a suitable distance above the nut-carrier 34 close to the lower member of the bolt feeder and placer 35 and above the latter. On the shaft 37, an actuator 45 is adjustably mounted and consists of a disk 46 having radially arranged arms or rods 47 which are also adapted to be struck by the pins 44 of the nut-carrier 34, and by this means the shaft 37 is given an intermittent movement to control the feed of the nuts in regular sequence to the nut-carrier 34 from a source of supply, which will be presently explained in detail.

The nut carrier 34, as clearly shown by Fig. 1, has a series of nut pockets arranged at intervals thereon and comprising opposite side angle members 48 having upstanding flanges 49 and rear upwardly projecting fingers 50 provided with securing plates 51, which are attached to the carrier. The fingers 50 are closer together than the vertical flanges 49, and intersecting the nut pockets is a circular groove 52. The nuts are fed to the carrier 34 by a chute 53 extending from a suitable source of supply and having an upward angle or inclination, as shown by Fig. 1, to and fully opening into an arcuate feed channel 54 with a free end 55 which is shaped to conform to the curvature of the groove 52, and the carrier 34 of the said free extremity 55 of the channel 54 is struck from the same center as the carrier and the groove, so as to permit the nuts to be regularly delivered in the path of circular movement of the carrier. The free or outlet extremity 55 of the channel 54 is formed with a comparatively wide slot 56 which extends into the body of the channel, but sufficient base support is provided at each side of the said slot 56 for the nuts. In other words, the slot 56 is of less width than the maximum transverse extent of the nuts. The free or outlet extremity 55 of the channel 54 stands above the carrier 34, but is deflected downwardly as at 57 to bring the free extremity or outlet in close relation to the upper edges of the flanges 49 or nut pockets. The flanges 49 of the nut pockets clear the downwardly deflecting free extremity or outlet 55 of the channel, but the distance that the nuts move from the said outlet into the pocket is slight in order to insure regular disposition of the nuts in the successive pockets. The feeder for the nuts or the means for moving the same into channel 54 consists of a disk 58 which is adjustable on the shaft 37 above the plane of the channel 54 and is provided with elongated arms or rods 59 which sweep closely over the channel 54 and engage the nuts and push the latter fully around the channel, the said arms or rods 59 having brush terminals 60, as clearly shown by Fig. 5, which extend into the channel and engage the several nuts with a sweeping action. The nut feeder, comprising the disk 58 and the arms or rods 59, is moved in timed relation to the carrier 34 by the pins 44 striking the arms or rods 47 of the actuator 45 and thereby give the interval rotation to the shaft 37. As the nuts are moved into the free extremity or outlet 55 of the channel 54, the fingers 50 of the several nut pockets enter the rear portion of the slot 56 and engage the rear edges of the nuts and steadily guide the latter and cause them to regularly fall or drop into the pockets, said fingers acting in conjunction with the brushes 60 of the arms or rods 59 of the nut feeder. The fingers 50 also serve as back stops for the nut pockets and after the nuts have been fed into the pockets and move regularly around to the point of engagement with the bolts, they are forced closely into the pockets by coming into engagement with a placement brush 61 carried by the lower angular extremity 62 of a vertical rod 63 secured to one side of the top frame 8, the rod 63 being bent at its lower extremity to properly dispose the brush 61 beneath the lower member of the bolt feeder and placer above the nut carrier 34. In the event that a nut passes around with the carrier and does not become assembled with a bolt, it is displaced from its pocket by a nut remover consisting of a rod 64 yieldingly secured to a hanger 65, as shown by Fig. 2, and having a share 66 fixed thereon and operating to throw the nut outwardly over the edge of the rotating carrier 34. The rod 64 is held in the groove 52, being suitably curved to follow in the groove, the said rod and the share operating as a plow and by means of this attachment the pockets will always come up and pass under the outlet or free extremity 55 of the channel 54 in condition to receive a nut and whereby the operation of the nut supply and feed is not in the least checked.

The bolt feeder and placer 35 comprises upper and lower members 67 and 68, each member consisting of a pair of thin sheet metal disks 69 and 70 which are spaced apart and formed with outwardly projecting teeth 71, which have straight edges 72 slightly inclined into curved recesses or seats 73. Between the plates 69 and 70 are pairs of antifrictional rollers or disks 74 mounted on vertical shafts 75, the rollers or disks 74 being exposed adjacent to the seats 73. The shafts 75 have bearing in the plates 69 and 70 and the rollers or disks 74 are mounted thereon to loosely rotate so as to prevent binding of the bolts at the inner terminals of the teeth or in the seats 73. The rollers or disks 74 also facilitate the rotation of the bolts. The pairs of plates 67 and 68 are connected for unitary action or rotation by vertical bolts or connecting devices 76, which also hold said pairs of plates uniformly spaced. The teeth 71 of the upper and lower pairs of plates are in vertical alinement, so that each bolt is engaged at two points throughout its length and is thereby positively moved by the teeth without liability of displacement from vertical position.

The bolts are fed into a hopper 77 which is shaped to cause the bolts to turn and fall through a central longitudinal slot 78 formed in the hopper. The hopper 77 tapers or converges toward the lower or inner outlet end 79 thereof, the slot 78 forming two narrow supporting ledges 80 at the inner outlet end of the hopper. The hopper 77 is shown in detail by Figs. 11 and 12 and is oscillated through the medium of an arm or bar 81 connected to a pendant 81ª of a band or yoke 82 secured to the lower side of the outer end of the hopper, the arm 81 being in the form of an elbow lever and fulcrumed, as at 83, to a hanger 83ª movably secured to a supporting bar 83ᵇ attached to the frame and the hopper, as shown, the lower angular member 84 of the said arm extending in the path of movement of the arms or rods 40 of the upper bolt mover 39, and having a spring 85 attached thereto to return it to normal position, the opposite end of this spring being secured to an adjacent part of the frame. The hopper 77 stands at a downward and inward angle of inclination so that the bolts placed therein may be caused to gradually and regularly fall into the slot 78 with the heads of the bolts uppermost. The ledges 80 at the inner outlet end 79 of the hopper stand over and slidingly bear upon the outer ends of parallel rails 86 which are inclined upwardly at their outer extremities and merge into horizontal members 87, which continue around in concentric relation to the bolt feeder and placer 35 and then change curve and project over the bolt feeder and placer below, as at 88, see Fig. 2, for the purpose of discharging the nutted bolts downwardly and through the base or frame. The rails 87 are uniformly spaced apart and form a guide for the bolts, said rails being suitably secured to portions of the frame and held in fixed position and immovable.

In the preparation of the machine for operation, bolts are placed in the hopper 77 and nuts in the chute 53 and are caused to gravitate so that the bolts will fall into the slot 78 in regular sequence and the nuts caused to enter the outer extremity of the channel 54, the side walls of the chute 53 and channel 54 being shallow in depth and exposing the greater portions of the nuts above the said side walls. The nuts are inwardly moved into engagement with the pockets in the nut carrier 34 and move around to the point of engagement with the bolts, and the bolts are fed downwardly through the guide formed by the rails 86 and 87 until they reach the point shown by Fig. 2, when the lower end of each bolt will be disposed over the screw opening of a nut below and all of the parts continue in timed unitary movement, so that each bolt and corresponding nut will be maintained in the relation just specified and said arm or rod 40 of the bolt movers 38 and 39 will have become disengaged from each bolt, and at such time the teeth 71 will take hold of the individual bolts and the latter will have gravitated and moved downwardly to the horizontal portion 70 of the rails and the lower end of the bolts will then be in engagement with or resting upon the nuts, as shown by Fig. 8. Each bolt is held in engagement with its nut below by reason of the fact that the bolt feeder and placer 35 and the nut carrier 34 rotate uniformly and in view of the relative positions of the teeth 71 and the bolt rails above, the bolts are successively brought into engagement with the upper and lower pairs of rollers exposed through the seats 73, and in this relation the bolts are moved rearwardly between the rails in engagement with the nuts and each bolt head is finally forced under a pressure plate 89, held by a support 90 over the rails and having a front upwardly flared end 91 to permit the bolt head to pass thereunder. The pressure plate 89 has a plurality of stems 92 extending upwardly therefrom and surrounded by springs 93, the stems 92 movably extending through a flange 94 at the top of the support and against which the springs 93 also bear. The pressure plate 89 holds each bolt firmly down in engagement with its nut and just as the said pressure plate 89 engages and holds each bolt, the bolt rotator or disk 24 peripherally contacts with and rotates a bolt, being held in yielding frictional engagement with the bolt through the action of the spring 26, hereinbefore described. The bolt continues to move through its engagement with the periphery of the bolt rotator or disk 24 and this engagement with the rotator continues only long enough to screw the bolt into the nut when the bolt will then pass from beneath the pressure plate 89 and out of engagement with the periphery of the disk or rotator 24. The rear portions of the rails 86, 87 and 88 are gradually inclined upwardly from a point a short distance in rear of the bolt from the rotator or disk 24 and by this means the bolts screwed into the nuts are gradually elevated to effect a clearance of the nuts from the pockets of the carrier 34. The bolts carrying the nuts are gradually moved out between the rear ends of the rails by the teeth 71 and the successive bolts are pushed rearwardly by the said teeth. It will be understood that only a bolt and nut is assembled at one time, but as the operation of the several parts is rather rapid, the assemblage of the bolts and nuts will be expeditiously carried on. As hereinbefore stated, when the nut fails to become engaged with a bolt, it passes on around with the carrier 34 until it is dislodged or displaced by the nut removing plow, which casts said nut over the edge of the carrier. It will be understood that the rotator or disk 24 moves in a direction reverse to the direction of rotation of the bolt feeder and placer 35 so as to cause the bolts to rotate in a proper direction to screw them into the nuts. The bolts, during their rotation, engage the anti-frictional rollers or disks 74 and are thereby eased in their movements without wearing of the parts or in any wise retarding the rotative action of the bolts. The rails comprising the bolt guide and leading from the hopper 77 will be shaped to the best advantage to cause the bolts to assume the positions desired during their course therethrough and bolts of different lengths may be operated upon by the improved machine in view of the fact that the several parts may be adjusted to bring them closer together or farther apart as may be required in operating upon bolts of different lengths.

I claim as my invention:—

1. In a machine for assembling bolts and nuts, a rotatable nut carrier, disposed horizontally and having a series of spaced nut carrying devices, means for individually feeding the nuts to the carrier and said devices, a bolt feeder and spacer having means for engaging the bolts, means for effecting a gravitation and disposition of the bolts into individual registering relation to the nuts, and rotatable means frictionally engaging the bolt shanks for turning the latter to screw them into the nuts.

2. In a machine for assembling bolts and nuts, means for feeding the bolts and nuts and moving them successively into engagement individually one relative to the other, and means having a swinging movement and embodying a rotatable device for frictionally engaging and turning the bolt shanks to cause the bolts to screw into the nuts.

3. In a machine for assembling bolts and nuts, a nut carrier having pockets to receive the nuts, means for feeding the nuts to the pockets, a bolt feeder and placer having teeth with anti-frictional devices at their inner portions, the nut carrier and bolt feeder and placer moving in unison, bolt movers to dispose the bolts in position for engagement by the teeth of the feeder and placer and to effect an engagement of the individual bolts and nuts, and means for rotating the bolts to cause them to screw into the nuts.

4. In a machine for assembling bolts and nuts, a nut carrier having pockets with upwardly projecting devices at the rear portions thereof, a nut feeding channel having a slot through which the said devices move, means for moving the nuts through the channel into the pockets, a nut feeder and placer above the nut carrier and movable in unison with the latter, means for causing bolts to be fed into position for engagement by the nut feeder and placer, and means for rotating the bolts to cause them to screw into the nuts.

5. In a machine for assembling bolts and nuts, a nut carrier having a plurality of pockets for holding nuts and a groove extending through the pockets, a nut removing plow having a rod extending into the groove to dislodge a nut from any one of the pockets when said nut has not been associated with its bolt, a bolt placer disposed over and movable in unison with the nut carrier, a slotted hopper for supplying the bolts, rails for guiding the bolts from the hopper, bolt movers having arms to engage upper and lower portions of the bolts and dispose them for operation by the placer, and means for rotating the bolts to cause them to individually screw into their corresponding nuts.

6. In a machine for assembling bolts and nuts, a nut carrier, a bolt placer mounted over and movable in unison with the nut carrier, the bolt placer having angular teeth with recesses at the inner terminals thereof and anti-frictional rollers exposed in the said recesses, means for feeding bolts into position for engagement by the teeth of the placer, and means for rotating the bolts to cause them to screw into the nuts.

7. In a machine for assembling bolts and nuts, means for feeding and carrying nuts, means for placing the bolts and nuts in position for assemblage, means for supplying and feeding the bolts with heads uppermost to the said placing means and including guide rails between which the bolts move in vertical positions, a spring-actuated pressure plate to engage the bolt heads and hold the bolts down in tight engagement with their nuts, and means for rotating the bolts for screwing them into the nuts.

8. In a machine for assembling bolts and nuts, means for feeding and carrying nuts, means for placing the bolts and nuts in position for assemblage, means for supplying and feeding the bolts with heads uppermost to the said placing means and including guide rails between which the bolts have gravitating movement in vertical positions, a spring-actuated pressure plate to engage the bolt heads and hold the bolts down in tight engagement with their nuts, and means yieldingly mounted for engaging the shanks of the bolts and rotating the bolts to cause them to screw into the nuts.

9. In a machine for assembling bolts and nuts, devices for carrying nuts and moving bolts in engagement with the nuts in position for final operation, means for supplying bolts and nuts to the machine, and a disk mounted to automatically move to and from the bolts and frictionally engage the bolt shanks for causing revolution of the bolts to screw them into the nuts, the said disk moving in a direction opposite to the said means for carrying nuts and moving the bolts.

10. In a machine for assembling bolts and nuts, rotatable devices individually acting upon the bolts and nuts in succession to dispose the individual bolts and nuts in engaging position, the one over the other, and swinging means embodying a rotating device with an exposed edge to frictionally contact with the bolt shanks and turn the bolts in a direction reverse to the movement of the devices for disposing the bolts and nuts into engaging position.

In testimony whereof I have hereunto set my hand in presence of two subscribing witnesses.

WALLACE R. HULL.

Witnesses:
WALTER A. WENNERSTROM,
JAS. A. GRIFFITH.